(12) United States Patent
Cardine et al.

(10) Patent No.: US 6,766,618 B2
(45) Date of Patent: Jul. 27, 2004

(54) SYSTEM FOR FIXING A WINDOW REGULATOR ON A FRAMELESS DOOR OF A VEHICLE

(75) Inventors: Patrice Cardine, Orleans (FR); Denis Chevy, Neuvy En Sullias (FR)

(73) Assignee: Meritor Light Vehicle Systems (France) (FR)

( * ) Notice: Subject to any disclaimer, the term of this patent is extended or adjusted under 35 U.S.C. 154(b) by 0 days.

(21) Appl. No.: 10/001,690

(22) Filed: Oct. 23, 2001

(65) Prior Publication Data

US 2002/0046504 A1 Apr. 25, 2002

(30) Foreign Application Priority Data

Oct. 24, 2000 (FR) .............................................. 00 13602

(51) Int. Cl.[7] .................................................. B60J 5/04
(52) U.S. Cl. .......................................... 49/502; 49/352
(58) Field of Search .......................... 49/348, 349, 352, 49/372, 502

(56) References Cited

U.S. PATENT DOCUMENTS

| | | | | |
|---|---|---|---|---|
| 3,584,415 A | * | 6/1971 | Keefe | 49/348 |
| 4,653,230 A | * | 3/1987 | Seo et al. | 49/502 |
| 5,226,259 A | * | 7/1993 | Yamagata et al. | 49/502 |
| 5,560,152 A | * | 10/1996 | Haner | 49/348 |

* cited by examiner

Primary Examiner—Jerry Redman
(74) Attorney, Agent, or Firm—Carlson, Gaskey & Olds

(57) ABSTRACT

This invention relates to a system for fixing a window regulator on a frameless door of a vehicle equipped with a fixed front window pane and a mobile rear pane, the front edge of the mobile pane being guided by a slideway which extends between the panes and of which the lower part is fixed in the door. The window regulator comprises a front rail and a rear rail parallel to the slideway, on which slide sliders displaced by cables actuated by a drive. The front rail is rigidly connected to the slideway in order to ensure parallelism between these two elements.

19 Claims, 2 Drawing Sheets

SYSTEM FOR FIXING A WINDOW REGULATOR ON A FRAMELESS DOOR OF A VEHICLE

BACKGROUND OF THE INVENTION

The present invention relates to the domain of window regulators mounted on frameless doors of vehicles.

On present-day vehicles comprising frameless doors, such as convertibles, window regulators of the "double lift" type which comprise two guide rails, are used, as such doors generally present a considerable length. The cables are disposed in sheaths, as it is necessary to be able to move the rails apart as a function of the length of the door.

When the door comprises a fixed window pane in its front upper part, a slideway for guiding the front edge of the mobile pane is fixed on the door. This slideway comprises an upper part which extends above the door and is disposed to the rear of the fixed pane, and a lower part disposed in the door and fixed to the structure of the latter by its upper and lower ends. The upper part of the slideway retains the rear edge of the fixed pane and ensures continuity of the two panes when the mobile pane is in upper position.

In general, the upper end of the lower part of the slideway, and the upper ends of the guide rails are fixed on the upper door reinforcement by means of screws cooperating with holes. These holes reduce the capacity of absorption of shocks during test crashes.

The lower ends of the slideway and of the two guide rails are adjustably fixed on the frame reinforcement transversely with respect to the door in order to take the manufacturing tolerances into account. Now, in order to avoid frictions during the movement of the mobile pane and immobilizations, it is necessary that the parallelism between the slideway and the two guide rails be as perfect as possible.

Adjustment of the lower means for fixing the slideway and the two guide rails is effected by hand when the door is assembled, this requiring many man-hours and being expensive.

SUMMARY OF THE INVENTION

This invention concerns a system for fixing a window regulator on a frameless door of a vehicle, said door being equipped with a fixed window pane above its front end and with a slideway for guiding the front edge of a mobile pane, said slideway having an upper part to the rear of the fixed pane and a lower part fixed in said door, said window regulator comprising a front guide rail and a rear guide rail parallel to said slideway and mounted on the door, two sliders which support the mobile pane and which may slide respectively on the front guide rail and the rear guide rail, a system of cables connected to the sliders and passing over return means provided at the ends of the rails and means for driving the cables in order to raise or lower the mobile pane.

Thanks to the invention, a perfect parallelism between the slideway and the front rail is ensured, if necessary, before the slideway and window regulator are mounted on the door.

The upper ends of the front rail and of the lower part of the slideway being fixed with respect to each other, only one of them needs to be fixed by means of a screw cooperating with a hole made in the upper reinforcement of the door. The elimination of a hole improves the structural capacity of this reinforcement.

The adjustment of the lower ends of the slideway and of the front and rear rails transversely with respect to the door is reduced to the adjustment of two points, instead of three as in the state of the art, as the front rail remains parallel to the slideway. The operation of positioning the slideway automatically places the front rail in position. All that remains is to adjust the position of the lower end of the rear rail.

According to a first embodiment of the invention, the front rail is fixed on the slideway by fixing means. According to a second embodiment of the invention, the slideway and the front rail are made in one piece.

It is a first object of the present invention to simplify adjustment of the parallelism between the slideway and the guide rails. It is another object of the invention to reduce the number of points of fixation of the slideway and the guide rails on the door in order to improve the structural capacities of the latter. The present invention attains these objects in that the front rail is rigidly connected to the slideway.

BRIEF DESCRIPTION OF THE DRAWINGS

The invention will be more readily understood on reading the following description given by way of example and with reference to the accompanying drawings, in which.

DESCRIPTION OF PREFERRED EMBODIMENT

Figure 1:
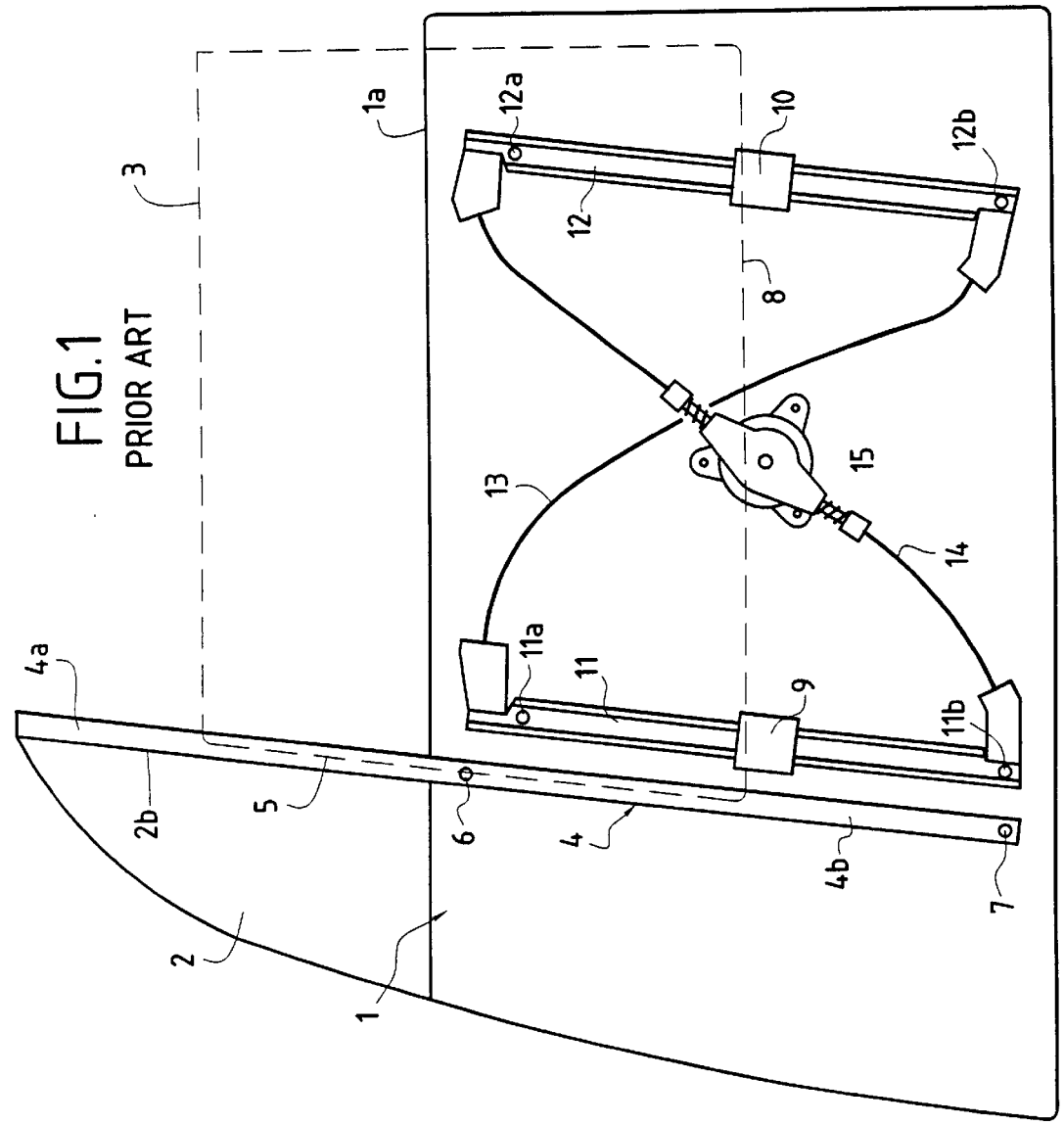
FIG. 1 is a side view of a frameless door of an automobile vehicle according to the state of the art, which comprises a fixed window pane at the front and a mobile pane to the rear, this mobile pane being driven by a so-called "double lift" window regulator and sliding in a front slideway.
Figure 2:
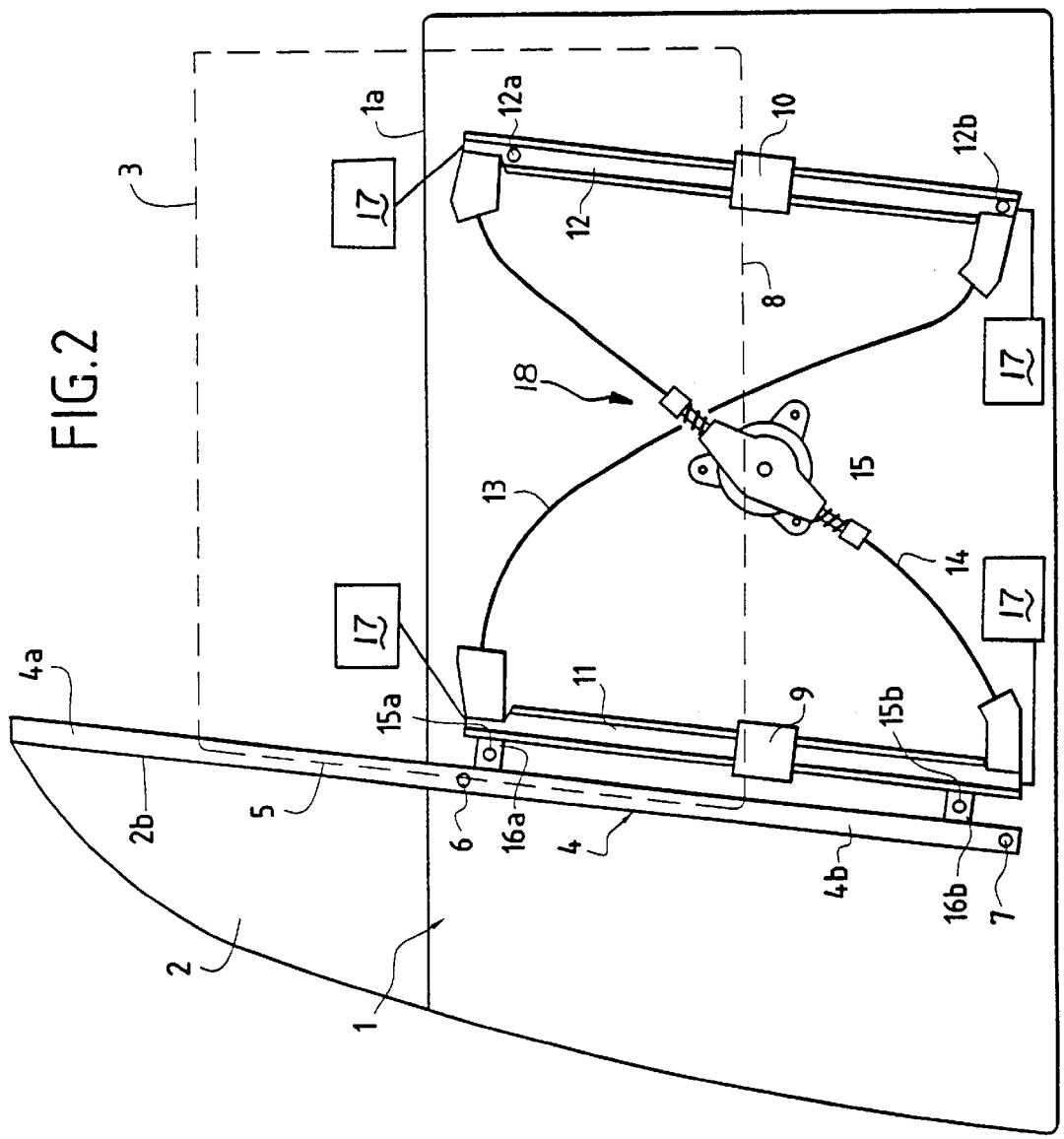
FIG. 2 is a side view of a frameless door of an automobile vehicle according to the invention, which comprises a fixed front window pane and a mobile rear pane driven by a so-called "double lift" window regulator and sliding in a front slideway.

Referring now to the drawings, FIGS. 1 and 2 show a frameless vehicle door 1 which comprises a fixed window pane 2 at the front and a mobile pane 3 to the rear. A slideway 4 for guiding the front edge 5 of the mobile pane 3 is interposed at the front of the substantially vertical path of movement of the mobile pane 3. This guiding slideway 4 comprises an upper part 4a which extends above the upper edge 1a of the door 1 and is interposed between the rear edge 2b of the fixed pane 2 and the front edge 5 of the mobile pane 3 in position of closure, and a lower part 4b housed in the door 1 and fixed to the inner reinforcement of the door 1 by its upper end 6 and its lower end 7.

The lower edge 8 of the mobile pane 3 is fixed on two sliders 9 and 10 able to slide respectively on a front guide rail 11 and a rear rail 12 parallel to the lower part 4b of the slideway 4. As illustrated in FIG. 2, the slideway 4 has a length that is greater than the length of the front guide rail 11. A system of cables 13, 14, connected to the sliders 9 and 10 and passing around return pulleys 17, shown schematically, provided at the upper and lower ends of the guide rails 11 and 12, and connected to drive means constituted by a drive assembly 15 placed between the guide rails 11 and 12, makes it possible to displace the two sliders 9 and 10 supporting the mobile pane 3 in unison.

In the present state of the art, shown in FIG. 1, the front rail 11 is fixed to the door 1 by its upper end 11a and its lower end 11b. Similarly, the rear rail 12 is fixed to the door 1 by its upper end 12a and its lower end 12b. The upper end 6 of the lower part 4b of the slideway 4 and the upper ends 11a and 12a of the rails 11 and 12 are fixed on the upper reinforcement of the door 1. The lower end 7 of the slideway 4 and the lower ends 11b and 12b of the guide rails 11 and 12 are adjustably fixed on the reinforcement of the door 1.

According to the window regulator 18 of the invention, as shown in FIG. 2, the front rail 11 and the lower part 4b of the slideway 4 are rigidly connected with the aid of fixing means 15a and 15b, screws for example, cooperating with holes made in one of the pieces, front rail 11 or lower part 4b, and in arms 16a and 16b which extend longitudinally from the other piece, lower part 4b or front rail 11. After assembly on the slideway 4 and by construction, the front rail 11 is thus always parallel to the lower part 4b of the slideway 4. The upper end 6 of the lower part 4b of the slideway 4 and the upper end 12a of the rear rail 12 are fixed, as in the state of the art, on the upper reinforcement of the door 1. The lower end 7 of the slideway 4 and the lower end 12b of the rail 12 are adjustably fixed on the reinforcement of the door 1, in order to allow adjustment of the parallelism between the rear rail 12 and the sideway 4. Adjustment of the parallelism is simplified, as it suffices to adjust the lower end 12b transversely with respect to the door 1 after the lower end 7 of the slideway 4 has been placed in position.

According to another variant embodiment, the slideway 4 and the front rail 11 are made in one piece.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A system for fixing a window regulator on a frameless door of a vehicle comprising:

said door equipped with a fixed windowpane and a mobile windowpane;

a slideway for guiding a front edge of the mobile windowpane having a lower part fixed in said door and an upper part interposed between a rear edge of the fixed windowpane and said front edge of said mobile windowpane;

said window regulator including a front guide rail rigidly connected to said slideway and a rear guide rail substantially parallel to said slideway and mounted on the door, a pair of sliders which support the mobile windowpane and which slide respectively on the front guide rail and the rear guide rail, a system of cables connected to the sliders and passing over a return mechanism provided at a pair of ends or each of the rails and a drive assembly for driving the cables.

2. The system of claim 1, wherein the front rail is fixed on the slideway by a fixing member.

3. The system of claim 1, wherein the slideway and the front rail are made in one piece.

4. The system of claim 1, wherein the front rail is connected to the slideway by at least one arms.

5. The system of claim 1, wherein the front rail and the lower part of the slideway are rigidly connected.

6. The system of claim 1, wherein said fixing members secure an upper part of said lower par of slideway to an upper end of said front rail.

7. The system of claim 1, wherein said fixing members secure a lower part of said lower part of slideway to a lower end or said front rail.

8. A system for fixing a window regulator on a frameless door of a vehicle comprising:

said door equipped with a fixed windowpane and a mobile windowpane;

a slideway for guiding a front edge of the mobile windowpane having an upper part to a rear edge of the fixed windowpane and a lower part fixed in said door;

said window regulator including a front guide rail rigidly connected to said slideway and a rear guide rail substantially parallel to said slideway and mounted on the door, a pair of sliders which support the mobile windowpane and which slide respectively on the front guide rail and the rear guide rail, a system of cables connected to the sliders and passing over a return mechanism provided at a pair of ends of each of the rails and a drive assembly for driving the cables, and wherein a fixing member cooperates with a hole in said front rail and an arm in said slideway.

9. The system of claim 8 wherein said fixing member is a screw.

10. A system for fixing a window regulator on a frameless door of a vehicle comprising:

said door equipped with a fixed windowpane and a mobile windowpane;

a slideway for guiding a front edge of the mobile windowpane having an upper part to a rear edge of the fixed windowpane and a lower part fixed in said door;

said window regulator including a front guide rail rigidly connected to said slideway and a rear guide rail substantially parallel to said slideway and mounted on the door, a pair of sliders which support the mobile windowpane and which slide respectively on the front guide rail and the rear guide rail, a system of cables connected to the sliders and passing over a return mechanism provided at a pair of end of each of the rails and a drive assembly for driving the cables, and wherein a fixing member cooperates with a hole in said slideway and an aim in said front rail.

11. The system of claim 10 wherein said fixing member is a screw.

12. A window regulator assembly comprising:

a slideway having an upper part and a lower part;

a front guide rail rigidly connected to said slideway, wherein a fixing member cooperates with a hole in said front rail and an arm in said slideway;

a rear guide rail substantially parallel to said slideway;

a pair of sliders which slide respectively on the front guide rail and the rear guide rail;

a system of cables connected to the sliders and passing over a return mechanism provided at a pair of ends of each of the rails; and a drive assembly for driving the cables.

13. The assembly of claim 12, wherein the front rail and the lower part of the slideway are rigidly connected.

14. The assembly of claim 12, wherein said fixing member secures an upper portion of said lower part of slideway to an upper end of said front rail.

15. The assembly of claim 12, wherein said fixing member secures a lower portion of said lower part of slideway to a lower end of said front rail.

16. The assembly of claim 12 wherein said fixing member is a screw.

17. The assembly of claim 12, wherein said front guide rail is unitary.

18. A window regulator assembly comprising:

a slideway having an upper part and a lower part;

a front guide rail rigidly connected to said slideway, wherein a fixing member cooperates with a hole in said slideway and an arm in said front rail;

a rear guide rail substantially parallel to said slideway;

a pair of sliders which slide respectively on the front guide rail and the rear guide rail;

a system of cables connected to the sliders and passing over a return mechanism provided at a pair of ends of each of the rails; and a drive assembly for driving the cables.

19. The assembly of claim 18 wherein said fixing member is a screw.

* * * * *

UNITED STATES PATENT AND TRADEMARK OFFICE
CERTIFICATE OF CORRECTION

PATENT NO.   : 6,766,618 B2
DATED        : July 27, 2004
INVENTOR(S)  : Cardine et al.

It is certified that error appears in the above-identified patent and that said Letters Patent is hereby corrected as shown below:

Column 3,
Line 53, "or" should read as -- of --.
Line 64, "par" should read as -- part --.

Column 4,
Line 35, "end" should read as -- ends --.
Line 38, "aim" should read as -- arm --.

Signed and Sealed this

Twenty-first Day of September, 2004

JON W. DUDAS
*Director of the United States Patent and Trademark Office*